United States Patent

Kawahara et al.

Patent Number: 5,151,323
Date of Patent: Sep. 29, 1992

[54] MAGNETIC RECORDING MEDIUM AND MANUFACTURING METHOD THEREOF

[75] Inventors: Setsuko Kawahara; Yasushi Nakano; Noboru Koyama, all of Hino, Japan

[73] Assignee: Konica Corporation, Tokyo, Japan

[21] Appl. No.: 588,689

[22] Filed: Sep. 28, 1990

[30] Foreign Application Priority Data

Sep. 29, 1989 [JP] Japan .................................. 1-256473

[51] Int. Cl.$^5$ ............................................. G11B 23/00
[52] U.S. Cl. .................................... 428/323; 428/329; 428/408; 428/694; 428/900; 427/128; 427/131; 427/407.1
[58] Field of Search ............... 428/329, 694, 408, 900; 427/131, 128, 407

[56] References Cited

U.S. PATENT DOCUMENTS

| | | | |
|---|---|---|---|
| 4,567,083 | 1/1986 | Arioka et al. | 428/900 |
| 4,844,946 | 7/1989 | Komatsu et al. | 428/694 |
| 4,851,289 | 7/1989 | Ogawa et al. | 428/900 |
| 5,001,006 | 3/1991 | Saito et al. | 428/323 |
| 5,043,212 | 8/1991 | Anto et al. | 428/694 |
| 5,055,349 | 10/1991 | Yasafuku et al. | 428/900 |

Primary Examiner—Paul J. Thibodeau
Assistant Examiner—Leszek Kiliman
Attorney, Agent, or Firm—Jordan B. Bierman

[57] ABSTRACT

A magnetic recording medium and manufacturing method thereof are disclosed. The recording medium comprises
- a support,
- a plurality of magnetic layer being provided on a surface of the support, and
- a backcoat layer being provided on the other surface of the support and comprising a binder and a carbon black, wherein
- an outermost magnetic layer being provided at the outermost portion from the support among said plurality of magnetic layers comprises, a binder, a magnetic powder and a carbon black in which the weight ratio of the carbon black to the magnetic powder is 0.1 to 0.5 percent,
- a magnetic layer other than the outermost magnetic layer comprises a binder, a magnetic powder different from the magnetic powder contained in the outermost layer and a carbon black in which the weight ratio of the carbon black to the magnetic powder is zero to 0.4 percent.

The plurality of magnetic layers are coated on the support under a condition of wet on wet.

18 Claims, 4 Drawing Sheets

MAGNETIC RECORDING MEDIUM AND MANUFACTURING METHOD THEREOF

FIELD OF THE INVENTION

The present invention relates to a magnetic recording medium such as a magnetic tape, a magnetic sheet and a magnetic disc.

BACKGROUND OF THE INVENTION

Generally, a magnetic recording medium such as a magnetic tape is prepared by coating on a support a magnetic paint comprising a magnetic powder, a binder resin, followed by drying. In conventional magnetic recording media, the magnetic layer consists of only one layer, therefore a broad frequency band region from a lower region to a higher one must be covered by one kind of magnetic powder. Particularly in a recent trend toward high density recording, a magnetic powder having a high Hc and a high BET value is used to meet requirements for a higher recording performance and lower noise in a high frequency region. Further, in a single-layered recording medium, high frequency characteristics are regarded as important, and chroma and audio output have not been paid much attention.

However, attaching too much importance to the high frequency characteristics inevitably leads to the use of a magnetic powder having a high Hc and a high BET value and brings about poor low frequency characteristics, because the magnetic recording medium comprises only one kind of magnetic powder contained in one magnetic layer.

In the magnetic recording medium for video application, there are proposed recording media having multiple magnetic layers in order to increase the recording capacity and improve magnetic recording characteristics in both of the high and low frequency regions for balancing properties. These proposals are found, for example, in Japanese Patent Publication Open to Public Inspection (hereinafter referred to as Japanese Patent O.P.I. Publication) Nos. 98803/1973, 172142/1984, 64901/1976, 56228/1983, 200425/1983, 146211/1988, 300425/1988, and Japanese Patent Examined Publication Nos. 2218/1957 and 12937/1981.

In these conventional techniques, functions are separately allotted to the upper and lower magnetic layers; the upper layer is designed to cover video output, and the lower layer to cover chroma and audio output.

Japanese Patent O.P.I. Publication 200425/1983 discloses a method for improving running durability and electro-magnetic transferring properties of such magnetic recording medium having two or more magnetic layers. The magnetic recording medium has two magnetic layers, upper and lower layers. Carbon black is added only in the upper layer to raise the running durability. No carbon black is added to the lower layer for increasing the packing density of magnetic particles in the layer so that the electro-magnetic conversion properties are improved. Besides, in the case of a video tape to be used in a VHS video-deck, the recording medium is required to contain a certain amount of carbon black to make an optical transmission satisfying the predetermined value. Accordingly, the carbon black content in the upper layer is excessively high when the carbon black is added only in the upper layer in accordance with the above-mentioned technique. As a result, poor dispersibility, or aggregation in heavy cases, of magnetic powder occurs in the upper layer, which results in deteriorated S/N ratio, rough surfaces, magnetic head clogging and poor durability. Incorporation of carbon black only in the lower layer also falls in the same results.

On the other hand, a proposal is made in Japanese Patent O.P.I. Publication No. 300425/1988 to incorporate carbon black having a particle size of 80 mμ or more in the upper layer and one having a particle size of 40 mμ or less in the lower layer, in order to improve the durability without deteriorating electromagnetic conversion properties.

SUMMARY OF THE INVENTION

The primary object of the present invention is to provide a magnetic recording medium having a high S/N ratio, excellent electromagnetic conversion properties with high output, a good light-shading property, a low friction coefficient and inhibited in noise increasing with running, in addition to an excellent running property and durability.

The secondary object of the present invention is to provide a manufacturing method of a magnetic recording medium by which the above medium, particularly the upper magnetic layer, can be coated with good reproducibility and the properties of the upper and lower layers can be fully developed without much dropout.

The above objects of the invention are achieved by a magnetic recording medium comprising
- a support,
- a plurality of magnetic layers being provided on a surface of the support,
- a backcoat layer being provided on the other surface of the support and comprising a binder and a carbon black, wherein
- the outermost magnetic layer being provided at the outermost portion from the support among said plurality of magnetic layers comprises, a binder, a magnetic powder and a carbon black in which the weight ratio of the carbon black to the magnetic powder is 0.1 to 0.5 percent,
- a magnetic layer other than the outermost magnetic layer comprises a binder, a magnetic powder different from the magnetic powder contained in the outermost magnetic layer and a carbon black in which the weight ratio the carbon black to the magnetic powder is zero to 0.4 percent.

And a manufacturing method for such magnetic recording medium comprising steps of
- preparing a first magnetic paint to be coated at the outermost portion of the plurality of magnetic layers, comprising a binder, magnetic powder and a carbon black in which the weight ratio of the carbon black to the magnetic powder is 0.1 to 0.5 percent,
- preparing a second magnetic paint to be coated between the outermost magnetic layer and a support, comprising a binder, a magnetic powder different from the magnetic powder contained in the first magnetic paint and a carbon black in which the weight ratio of the carbon black to the magnetic powder is zero to 0.4 percent,
- coating the first magnetic paint and the second magnetic paint in multilayered state on a surface of the support under a wet on wet condition,
- preparing a backcoat solution comprising a binder and a carbon black, and coating the backcoat solution on the other surface of the support.

DETAILED DESCRIPTION OF THE INVENTION

Figure 1:
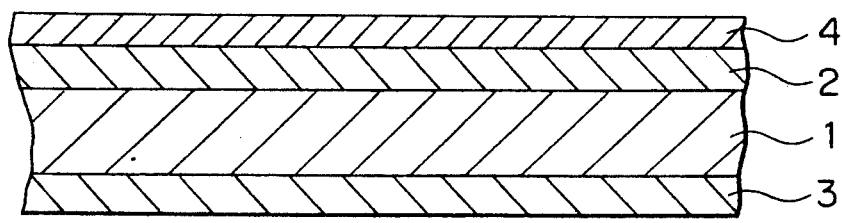
FIGS. 1 and 2 are each cross sections magnetic recording media.

The magnetic layer of the invention consists of multiple layers, so that each layer can be formed to have separate functions: the upper layer improves recording and playback properties in a higher frequency region such as video output, and the lower layer improves recording and playback properties in a relatively lower frequency region such as chroma and audio output. For this purpose, it is necessary that the upper layer, particularly the top layer, has a coercive force (Hc) larger than that of the lower layer, and that the layer thickness of the upper layer is thin, desirably 0.6 μm or less. And the film thickness of the lower layer adjacent to the upper layer is desirably 1.5 to 3.0 μm. In the case of the magnetic recording medium has three or more layers, the total thickness of the layers other the outermost layer is preferably 1.5 to 3.0 μm.

The noticeable fact in the invention is that since the amount of carbon black in the outermost magnetic layer is specified from 0.1 to 0.5% by weight of the magnetic powder, there can be attained a reduced surface friction and a good running property, in addition to an improved dispersibility of the magnetic powder due to the use of carbon black in an appropriate amount, a higher output resulting from the high packing density of magnetic powder, and good electromagnetic conversion characteristics based on an improved S/N ratio brought by an excellent surface smoothness. In other words, the use of carbon black in an amount up to 0.5 wt %, contrary to a normal method which uses an excessive amount in the upper layer for shading light, can realize a higher output and a higher S/N ratio with a good smoothness; and the use of carbon black in an amount of 0.1 wt % or more makes it possible to maintain running property and durability. Moreover, at least one of the lower magnetic layers, particularly the layer adjacent to the outermost layer, contains 0.4% or less carbon black by weight of the magnetic powder, and thereby the lower layer can perform its function without deteriorating electro-magnetic conversion characteristics.

In the invention, a backcoat layer containing carbon black as the primary filler is provided on the support oppositely with the magnetic layer, and accordingly the light-shading property required of the medium can be secured. With the addition of carbon black to the backcoat layer, sticking of a dust due to electrostatic charge can be prevented, and this leads to a lower friction coefficient and a good running durability.

It is desirable that the relation between the weight ratio of carbon black to the magnetic powder in the outermost magnetic layer ($A_1$) and that in at least one magnetic layer other than the outermost layer, in each layer when multiple lower layers exist, ($A_2$) is $A_1 > A_2$; that is, the packing density of magnetic powder in the lower layer is always larger than that in the upper layer, and consequently chroma output, which is relatively unstable in nature, can be generated in a good state. And as to $A_2$, $0 \leq A_2 \leq 0.4$ part by weight of magnetic powder is desirable.

In order to maximize the above effects, the amount of carbon black in the outermost layer is desirably 0.11 to 0.45% by weight of magnetic powder. The amount of carbon black in the lower layer other than the outermost layer is desirably 0 to 0.35% by weight. And the amount of carbon black in the backcoat layer is desirably in a weight ratio of carbon black to binder from 20/80 to 80/20, and more desirably from 40/60 to 60/80.

According to the invention, the second magnetic paint for the lower layers other than the outermost layer and the first magnetic paint for the outermost layer are multilayeredly coated in wet state, simultaneous or sequential wet multilayer coating. Being a wet on wet coating, the outermost layer can be easily coated on the lower layer. Particularly, a thin and uniform coating of the outermost layer and a multilayer coating with a good reproducibility can be attained. In conventional methods, however, a web coated with the lower layer is dried and once rolled up as described above. Such rolling up is liable to rough the surface of the lower layer; therefore coating of the top layer results in badly and inevitably causes dropout. The present invention can provide a multilayered structure without arousing such problems.

In the invention, except for clear boundaries materially existing, there exist among each layer boundary regions having a certain thickness in which magnetic powders of two layers are mixed together. A layer excluding such a boundary region is regarded as "each layer" described above.

Figure 2:
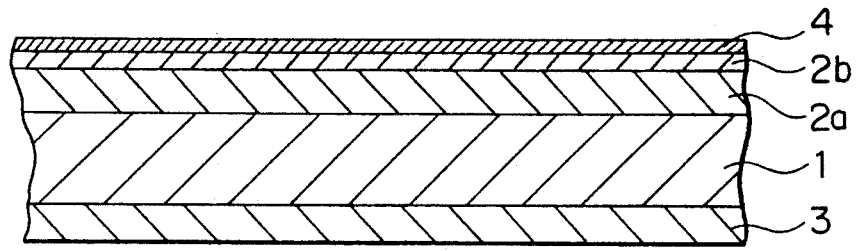

As shown by FIG. 1, the magnetic recording medium of the invention comprises of the first magnetic layer 2, the lower layer, and the second magnetic layer 4, the upper layer, both of which are laminated in this order on a non-magnetic support 1 made of polyethylene terephthalate or the like. And on the opposite side of the support, a backcoat layer 3 is provided. An overcoat layer may be provided on the second magnetic layer. FIG. 2 illustrates the magnetic recording medium whose lower magnetic layer is further divided into layer 2a and layer 2b.

The magnetic powder that is contained in the magnetic layers 2, 2a, 2b and 4 includes iron oxide powders such as $\gamma\text{-Fe}_2\text{O}_3$, Co containing $\gamma\text{-Fe}_2\text{O}_3$. $\text{Fe}_3\text{O}_4$ and Co containing $\text{Fe}_3\text{O}_4$; and magnetic metal powders containing Fe, Ni and Co as a main component such as Fe, Ni, Co, Fe—Ni—Co alloy, Fe—Ni alloy, Fe—Al alloy, Fe—Al—Ni alloy, Fe—Al—Co alloy, Fe—Mn—Zn alloy, Fe—Ni—Zn alloy, Fe—Al—Ni—Co alloy, Fe—Al—Ni—Cr alloy, Fe—Al—Co—Cr alloy, Fe—Co—Ni—Cr alloy, Fe—Co—Ni—P alloy and Co—Ni alloy. In the top magnetic layer 4, the other magnetic layers 2, 2a and 2b, and the backcoat layer 3, prescribed amounts of carbon black are contained according to the invention.

Among the foregoing magnetic powders, one suitable to each of the magnetic layers 2, 2a, 2b and 4 may be selected. For example, a high output recording medium can be prepared by using in the top layer 4 a magnetic powder having a coercive force (Hc) higher than that of a magnetic powder used in the lower layer 2.

Carbon blacks used in the magnetic layers and the backcoat layer for shading light are Raven 2000 (specific surface area: 190 m$^2$/g, particle size: 18 m$\mu$), 2100, 1170 and 1000 made by Columbia Carbon; and #100, #75, #40, #35 and #30 made by Mitsubishi Kasei. There may be also used conductive carbon blacks such as Conductex 975 [BET value (hereinafter abbreviated as BET): 250 m$^2$/g, DBP oil-absorbing volume (hereinafter abbreviated as DBP): 170 ml/100 g, particle size: 24 m$\mu$], Conductex 900 (BET: 125 m$^2$/g, particle size: 27 m$\mu$), Conductex 40-220 (particle size: 20 m$\mu$) and Conductex SC (BET: 220 m$^2$/gr, DBP: 115 m$\pm$/100 g, particle size: 20 m$\mu$) of Columbia Carbon; Vulcan XC-72 (specific surface area: 254 m$^2$/g, particle size: 30 m$\mu$), Vulcan P (BET: 143 m$^2$/gr, DBP: 118 ml/100 gr, particle size: 20 m$\mu$) and Black Pearls 2000 (particle size: 15 m$\mu$) of Cabot; Raven 1040 and 420 of Columbia Carbon; and #44 of Mitsubishi Kasei.

Other carbon blacks usable in the invention are Vulcan 9 (BET: 140 m$^2$/g, DBP: 114 ml/100 g, particle size: 19 m$\mu$) of Cabot; #80 (BET: 117 m$^2$/g, DBP: 113 ml/100 g, particle size: 23 m$\mu$) of Asahi Carbon; HS 100 (BET: 32 m$^2$/g, DBP: 180 ml/100 g, particle size: 53 m$\mu$) of Denki Kagaku Kogyo; #22 B (BET: 55 m$^2$/g, DBP: 131 ml/100 g, particle size: 40 m$\mu$), #20 B (BET: 56 m$^2$/g, DBP: 115 ml/100 g, particle size: 40 m$\mu$) and #3500 (BET: 47 m$^2$/g, DBP: 187 ml/100 g, particle size: 40 m$\mu$) of Mitsubishi Kasei. Other applicable ones include CF-9, #4000 and MA-600 of Mitsubishi Kasei; Black Pearls L, Monarck 800, Black Pearls 700, Black Pearls 1000, Black Pearls 880, Black Pearls 900, Black Pearls 1300, Black Pearls 2000 and Sterling V of Cabot; Raven 410, Raven 3200, Raven 430, Raven 450, Raven 825, Raven 1255, Raven 1035, Raven 1000, Raven 5000 and Ketchen Black FC.

Characteristics of materials preferably used in the magnetic recording medium of the invention are as follows:

|  | Upper layer | Lower layer |
| --- | --- | --- |
| Magnetic powder |  |  |
| Coersive force Hc | 750–850 | 650–750 |
| Average length of longer axis ($\mu$m) | 0.20–0.28 | 0.28–0.35 |
| Specific surface area BET | 45–55 | 35–45 |
| Fe$^{2+}$/Fe$^{3+}$ | 4–10 | 28–38 |
| Carbon black Average particle size ($\mu$m) | 35–45 | 16–25 |

Preferable average particle size of carbon black to be added to the backcoat layer is 20 to 65 $\mu$m.

To each of the magnetic layers, there may be added a lubricant such as a silicone oil, graphite, molybdenum disulfide, tungsten disulfide, a monobasic fatty acid having 12 to 20 carbon atoms e.g. stearic acid, a fatty ester having 13 to 40 carbon atoms and a polishing agent such as fused alumina.

The binders used in the magnetic layers 2, 2a, 2b and 4 are desirably ones having an average molecular weight of 10,000 to 200,000, of which examples are vinyl chloride-vinyl acetate copolymers, vinyl chloride-vinylidene chloride copolymers, vinyl chloride-acrylonitrile copolymers, polyvinyl chlorides, urethane resins, butadiene-acrylonitrile copolymers, polyamide resins, polyvinyl butyrals, cellulose derivatives such as cellulose acetate butylates, cellulose diacetates, cellulose triacetates, cellulose propionates and nitrocellulose, styrene-butadiene copolymers, polyester resins, synthetic rubbers of various kinds, phenol resins, epoxy resins, urea resins, melamine resins, phenoxy resins, silicone resins, acrylic reactive resins, mixtures of an isocyanate prepolymer and a high-molecular polyester resin, mixtures of a polyester polyol and a polyisocyanate, urea formaldehyde resins, mixtures of a low molecular weight glycol/a high molecular weight glycol/an isocyanate, and mixtures of the foregoing.

These binders are desirably resins containing a hydrophilic polar group such as —SO$_3$M, —COOM or —PO(OM')$_2$, where M is a hydrogen atom, or an alkali metal including lithium, potassium, sodium; M' is a hydrogen atom, or an alkali metal such as lithium, potassium, sodium, or a hydrocarbon residue. These hydrophilic polar groups improve the compatibility of the resins with the magnetic powder, and thereby the dispersibility of the magnetic powder is further improved and the aggregation of the magnetic powder can be prevented. This increases the stability of a magnetic paint and leads to the improvement of durability of the recording medium.

Of these binders, vinyl chloride copolymers can be prepared by copolymerizing vinyl chloride monomers with copolymerizable monomers containing an alkali salt of sulfonic or phosphoric acid and other copolymerizable monomers if necessary. Since these copolymers are based on vinyl synthesis, they can be easily synthesized and adapted to a specific requirement by selecting copolymerizable monomers.

The metal that makes a salt with the above sulfonic acid or phosphoric acid is an alkali metal such as sodium, potassium or lithium, and potassium is preferable in view of solubility, reactivity and yield.

The backcoat layer 3 formed on the reverse side of the support comprised of the above-mentioned binder containing carbon black and non-magnetic particles such as zinc oxide according to a specific requirement.

As the material of the support 1, plastics such as polyethylene terephthalate and polypropylene; metals such as Al and Zn; and ceramics such as glass, BN, Si carbide, porcelain and china are used.

Figure 3:
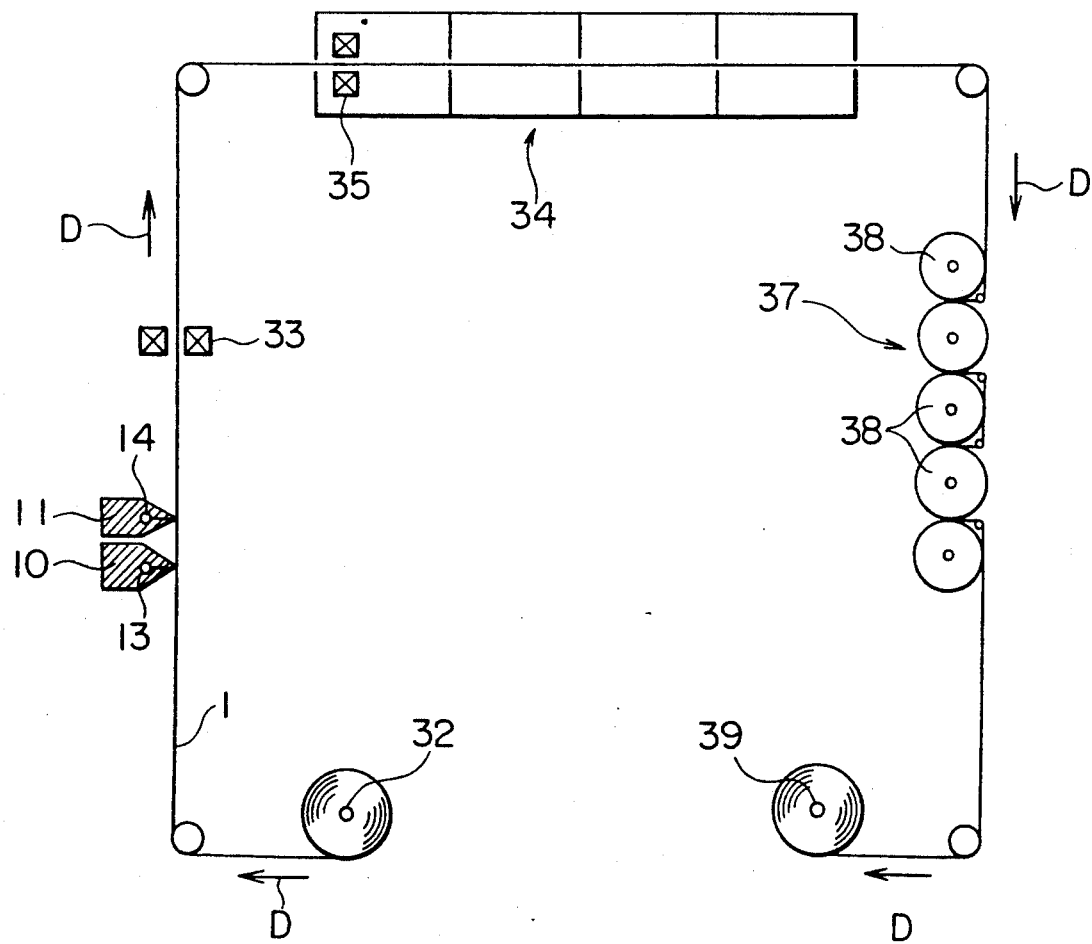
FIG. 3 is a schematic diagram of the manufacturing equipment for the magnetic recording medium, FIGS. 4-A, 4-B and 4-C are schematic diagrams of each extrusion coater, FIGS. 5-A and 5-B are graphic charts showing property changes when the addition amount of carbon black is altered.

A schematic diagram of an example of the manufacturing equipment is shown by FIG. 3.

In manufacturing the recording medium shown by FIG. 1 using this equipment, the film support 1 delivered from the feed roll 32 is coated with paints for the above magnetic layers 2 and 4, the coated layers are then subjected to orientation by the first orienting magnet 33, 2000 Gauss, for example, and then the support is fed into the dryer 34 in which the second orienting magnet 35, 2000 Gauss, for example, is mounted, where the coated layers are dried with hot air blown from nozzles fitted above and below the support. Next, the dried support is fed into the super calender 37 composed of calender rolls 38 and subjected to calendering, and then rolled up by the take-up roll 39. Each paint may be fed to the extruding coaters 10 and 11 via an unillustrated in-line mixer. In the schematic diagram, the arrow D points the direction in which the film support is carried. Each of the extruding coaters 10 and 11 is equipped with a liquid sump 13 and 14 respectively, from which paints are applied by a wet on wet method in a multilayered structure. In manufacturing the recording medium shown by FIG. 2, one more extruding coater is added to the layout shown by FIG. 3.

Figure 4A:
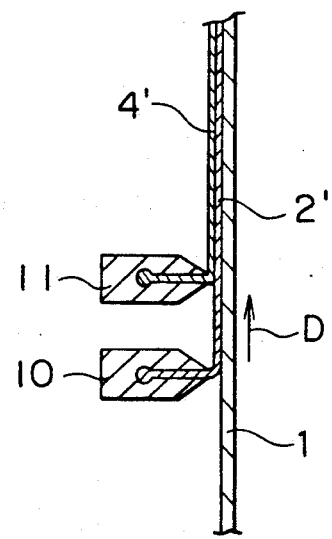
Figure 4B:
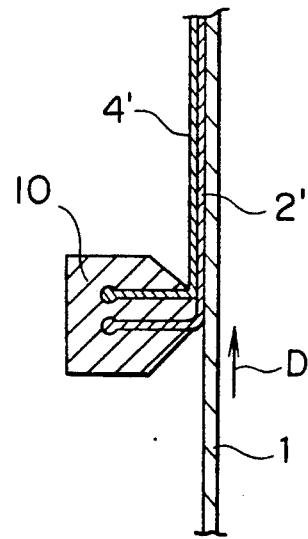
Figure 4C:
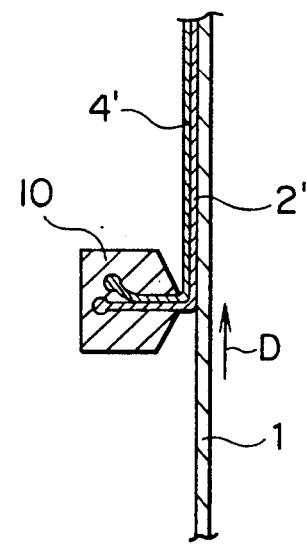

FIG. 4 illustrates an extruding coater. FIG. 4 (A) illustrates the same type as is shown in FIG. 3, 2-head type, for sequential wet on wet multilayer coating. FIG.

4 (B) illustrates a single head type for sequential wet on wet multilayer coating, and FIG. 4 (C) shows a single head type which combines the two magnetic paints 2' and 4' in the head and extrudes them as a composite of layers for simultaneous wet on wet multilayer coating. Any of them well serves the purpose of the invention.

The equipment used for the multilayer coating is not necessarily limited to an extruding coater. Other conventional coating equipment also works.

EXAMPLES

The present invention is hereunder described with the examples. Components, proportions and orders of procedure that appear below can be altered so far as the spirit of the invention is not deviated. In the following examples, all "parts" mean parts by weight.

EXAMPLES 1 THROUGH 33, COMPARATIVE EXAMPLES 1 THROUGH 8

The following compositions of matter were kneaded and dispersed with a kneader and a sand mill.

| Magnetic paint A for the upper layer | |
|---|---|
| Co-γ-Fe₂O₃ (Hc, particle size and BET value are shown in Table 1) | 100 parts |
| Vinyl chloride-vinyl acetate-vinyl alcohol copolymer having potassium sulfonate (MR 110 made by Nippon Zeon) | 10 parts |
| Polyester polyurethane resin having potassium sulfonate (UR 8300 made by Toyobo) | 7 parts |
| α-Al₂O₃ (average particle size: 0.3 μm) | 1 part |
| Carbon black (as shown in Table 1) | |
| Myristic acid | 2 parts |
| Stearic acid | 1 part |
| Butyl stearate | 1 part |
| Methyl ethyl ketone | 200 parts |
| Cyclohexanone | 100 parts |
| Toluene | 100 parts |

| Magnetic paint B for the lower layer | |
|---|---|
| Co-γ-Fe₂O₃ (Hc, particle size and BET value are shown in Table 1A) | 100 parts |
| Vinyl chloride-vinyl acetate-vinyl alcohol copolymer having potassium sulfonate (MR 110 made by Nippon Zeon) | 10 parts |
| Polyester polyurethane resin having potassium sulfonate (UR 8300 made by Toyobo) | 7 parts |
| Carbon black (as shown in Table 1A) | |
| Myristic acid | 2 parts |
| Stearic acid | 1 part |
| Butyl stearate | 1 part |
| Methyl ethyl ketone | 200 parts |
| Cyclohexanone | 100 parts |
| Toluene | 100 parts |

After kneading and dispersing the magnetic paints A and B, 5 parts of polyisocyanate (Coronate L made by Nippon Polyurethane) were added thereto. Next, the magnetic paints were coated in sequence on a 14.0 μm thick polyethylene terephthalate base film with the equipment shown by FIG. 3, followed by orientation, drying and calendering. The dry coating thickness of the upper layer was 0.5 μm, and that of the lower layer was 3.0 μm.

Then, the backcoating paint having the following composition was coated on the reverse side of the magnetic layers to a dry thickness of 1.0 μm. In comparative example 6, carbon black was replaced by 50 parts of α-Al₂O₃.

| Carbon black | |
|---|---|
| (Shown in Table 1A) | 60 parts |
| α-Al₂O₃ (Particle size 200 μm) | 20 parts |
| Nitrocellulose | 30 parts |
| Polyurethane resin having potassium sulfonate (UR 8300 made by Toyobo) | 20 parts |
| Polyisocyanate (Coronate L made by Nippon Polyurethane) | 13 parts |
| Cyclohexanone | 800 parts |
| Methyl ethyl ketone | 1000 parts |
| Toluene | 800 parts |

Thus, wide magnetic films were prepared and rolled up. The films were then cut into ½ in. wide tapes to prepare video tapes shown in Table 1A. Each of these video tapes was evaluated for the following properties. The results are shown in Table 1B.

(a) RF output, Lumi S/N and Chroma S/N:
  measured with a video deck HR-S7000 made by Japan Victor and a color video noise meter 925 D/1 made by Shibasoku and indicated by the values (dB) relative to those of a reference tape.
The frequency of each signal was as follows:
  RF output : 6 MHz
  Lumi S/N : 6 MHz
  Chroma output : 629 KHz
  Chroma S/N : 629 KHz
  Audio output : 1.7 MHz (b) Coefficient of dynamic friction:
  measured at a tape speed of 1 cm/sec and an inlet tension of 20 g while contacting a tape a half round (180°) at 25° C. on a 4φ chromium plated stainless steel pin of a tape runnabvility tester TBT-300 D mode by Yokohama System Laboratory. μk was calculated with the following expression:

$$\mu k = \frac{1}{\pi} \ln \frac{x}{20} \quad (x = \text{outlet tension (g)})$$

(c) Still durability:
  a playback output of a still image was observed for 120 minutes. Time required for lowering the playback output 2 dB or more was indicated in terms of minute. A sample on which no lowering was observed was OK'd.

(d) Doubling over of edges in runnability test:
  a state of a tape was observed after 400 passages at 40° C. and RH 80%.

Dropout:
  an output longer than 15 μsec and having a RF envelope output drop more than 20 dB was regarded as one dropout and counted with a dropout counter VD-5M made by Japan Victor over the whole length of a tape, and thus an average number per minute was determined.

(f) Light transmittance:
  while running a tape on a VHS deck HR-6500 made by Japan Victor, the amount of transmitted light was read with Servocorder SR 6312 in terms of voltage and then converted into a light transmittance.

(g) Rubbing noise increasing:
  measurement was performed by the following procedure by use of measuring system consisting of video deck HR-S7000, Color video noise meter 952 D/1 and a spectrum analyser:

(i) noise level of the measuring system was measured without tape running.
(ii) the sample tape to be measured was run through the video deck 10 times each for 1 minute for measuring the rubbing noise at 6–8 MHz. The rubbing noise was indicated by dB value referring the system noise as 0 dB.
(iii) the deference of the rubbing noise levels of the 1st pass and 10th pass was calculated to determine the rubbing noise increasing by passing through video deck.

TABLE 1A

| | Carbon black | | | | | | Magnetic powder | | | | | | | |
|---|---|---|---|---|---|---|---|---|---|---|---|---|---|---|
| | Upper layer | | Lower layer | | BC layer | | Upper layer | | | | Lower layer | | | |
| | Content (parts) | Particle size (μm) | Content (parts) | Particle size (μm) | Content (parts) | Particle size (μm) | Hc (Oë) | Length of longer axis (μm) | BET (m²/g) | $\frac{Fe^{+2}}{Fe^{+3}}$ (%) | Hc (Oë) | Length of longer axis (μm) | BET (m²/g) | $\frac{Fe^{+2}}{Fe^{+3}}$ (%) |
| Example 1 | 0.4 | 40 | 0 | — | 50 | 40 | 800 | 0.24 | 50 | 6 | 700 | 0.35 | 40 | 35 |
| Example 2 | 0.5 | 40 | 0 | — | 50 | 40 | 800 | 0.24 | 50 | 6 | 700 | 0.35 | 40 | 35 |
| Example 3 | 0.1 | 40 | 0 | — | 50 | 40 | 800 | 0.24 | 50 | 6 | 700 | 0.35 | 40 | 35 |
| Example 4 | 0.4 | 40 | 0.4 | 20 | 50 | 40 | 800 | 0.24 | 50 | 6 | 700 | 0.35 | 40 | 35 |
| Example 5 | 0.4 | 40 | 0.2 | 20 | 50 | 40 | 800 | 0.24 | 50 | 6 | 700 | 0.35 | 40 | 35 |
| Example 6 | 0.4 | 40 | 0.2 | 20 | 50 | 40 | 850 | 0.24 | 50 | 6 | 700 | 0.35 | 40 | 35 |
| Example 7 | 0.4 | 40 | 0.2 | 20 | 50 | 40 | 750 | 0.24 | 50 | 6 | 700 | 0.35 | 40 | 35 |
| Example 8 | 0.4 | 40 | 0.2 | 20 | 50 | 40 | 800 | 0.24 | 50 | 6 | 750 | 0.35 | 40 | 35 |
| Example 9 | 0.4 | 40 | 0.2 | 20 | 50 | 40 | 800 | 0.24 | 50 | 6 | 650 | 0.35 | 40 | 35 |
| Example 10 | 0.4 | 40 | 0.2 | 20 | 50 | 40 | 800 | 0.28 | 50 | 6 | 700 | 0.35 | 40 | 35 |
| Example 11 | 0.4 | 40 | 0.2 | 20 | 50 | 40 | 800 | 0.20 | 50 | 6 | 700 | 0.35 | 40 | 35 |
| Example 12 | 0.4 | 40 | 0.2 | 20 | 50 | 40 | 800 | 0.24 | 50 | 6 | 700 | 0.28 | 40 | 35 |
| Example 13 | 0.4 | 40 | 0.2 | 20 | 50 | 40 | 800 | 0.24 | 55 | 6 | 700 | 0.35 | 40 | 35 |
| Example 14 | 0.4 | 40 | 0.2 | 20 | 50 | 40 | 800 | 0.24 | 45 | 6 | 700 | 0.35 | 40 | 35 |
| Example 15 | 0.4 | 40 | 0.2 | 20 | 50 | 40 | 800 | 0.24 | 50 | 6 | 700 | 0.35 | 45 | 35 |
| Example 16 | 0.4 | 40 | 0.2 | 20 | 50 | 40 | 800 | 0.24 | 50 | 6 | 700 | 0.35 | 35 | 35 |
| Example 17 | 0.4 | 40 | 0.2 | 20 | 50 | 40 | 800 | 0.24 | 50 | 4 | 700 | 0.35 | 40 | 35 |
| Example 18 | 0.4 | 40 | 0.2 | 20 | 50 | 40 | 800 | 0.24 | 50 | 8 | 700 | 0.35 | 40 | 35 |
| Example 19 | 0.4 | 40 | 0.2 | 20 | 50 | 40 | 800 | 0.24 | 50 | 6 | 700 | 0.35 | 40 | 28 |
| Example 20 | 0.4 | 40 | 0.2 | 20 | 50 | 20 | 800 | 0.24 | 50 | 6 | 700 | 0.35 | 40 | 38 |
| Example 21 | 0.4 | 35 | 0.2 | 20 | 50 | 20 | 800 | 0.24 | 50 | 6 | 700 | 0.35 | 40 | 38 |
| Example 22 | 0.4 | 45 | 0.2 | 20 | 50 | 20 | 800 | 0.24 | 50 | 6 | 700 | 0.35 | 40 | 38 |
| Example 23 | 0.4 | 40 | 0.2 | 16 | 50 | 20 | 800 | 0.24 | 50 | 6 | 700 | 0.35 | 40 | 38 |
| Example 24 | 0.4 | 40 | 0.2 | 25 | 50 | 20 | 800 | 0.24 | 50 | 6 | 700 | 0.35 | 40 | 38 |
| Example 25 | 0.4 | 40 | 0.2 | 20 | 60 | 40 | 800 | 0.24 | 50 | 6 | 700 | 0.35 | 40 | 8 |
| Example 26 | 0.4 | 40 | 0.2 | 20 | 60 | 40 | 700 | 0.24 | 50 | 6 | 600 | 0.35 | 40 | 8 |
| Example 27 | 0.4 | 40 | 0.2 | 20 | 60 | 40 | 700 | 0.30 | 50 | 6 | 600 | 0.38 | 40 | 8 |
| Example 28 | 0.4 | 40 | 0.2 | 20 | 60 | 40 | 700 | 0.30 | 40 | 6 | 600 | 0.38 | 30 | 8 |
| Example 29 | 0.4 | 85 | 0.2 | 20 | 60 | 40 | 800 | 0.24 | 50 | 6 | 700 | 0.35 | 40 | 35 |
| Example 30 | 0.4 | 115 | 0.2 | 35 | 60 | 40 | 800 | 0.24 | 50 | 6 | 700 | 0.35 | 40 | 35 |
| Example 31 | 0.4 | 40 | 0.2 | 20 | 60 | 300 | 800 | 0.24 | 50 | 6 | 700 | 0.35 | 40 | 35 |
| Example 32 | 0.5 | 40 | 0.4 | 20 | 50 | 40 | 800 | 0.24 | 50 | 6 | 700 | 0.35 | 40 | 35 |
| Example 33 | 0.1 | 40 | 0.4 | 20 | 50 | 40 | 800 | 0.24 | 50 | 6 | 700 | 0.35 | 40 | 35 |
| Comp. Example 1 | 0.6 | 40 | 0.4 | 20 | 50 | 40 | 800 | 0.24 | 50 | 6 | 700 | 0.35 | 40 | 35 |
| Comp. Example 2 | 0 | — | 0 | — | 50 | 40 | 800 | 0.24 | 50 | 6 | 700 | 0.35 | 40 | 35 |
| Comp. Example 3 | 0.5 | 40 | 0.5 | 20 | 50 | 40 | 800 | 0.24 | 50 | 6 | 700 | 0.35 | 40 | 35 |
| Comp. Example 4 | 2.0 | 85 | 2.0 | 20 | 50 | 40 | 800 | 0.24 | 50 | 6 | 700 | 0.35 | 40 | 35 |
| Comp. Example 5 | 2.0 | 115 | 2.0 | 35 | 50 | 40 | 800 | 0.24 | 50 | 6 | 700 | 0.35 | 40 | 35 |
| Comp. Example 6 | 0.4 | 40 | 0 | — | —* | — | 800 | 0.24 | 50 | 6 | 700 | 0.35 | 40 | 35 |
| Comp. Example 7 | 0.4 | 40 | 0 | — | 50 | 40 | 800 | 0.24 | 50 | 6 | 800 | 0.24 | 50 | 6 |
| Comp. Example 8 | 0.4 | 40 | 0 | — | 50 | 40 | 700 | 0.35 | 40 | 8 | 700 | 0.35 | 40 | 8 |

*Fifty parts of α-Al₂O₃ was added in place of carbon black.

TABLE 1B

| | Electric character (dB) | | | | Coefficient of dynamic friction | Running properties | | Dropout (number) | Rubbing noise increasing (dB) | Light transmittance (%) |
|---|---|---|---|---|---|---|---|---|---|---|
| | Output | | S/N ratio | | | | | | | |
| | RF | Chroma | Lumi | Chroma | | Runnability | Still (min) | | | |
| Example 1 | +0.5 | +0.5 | +1.0 | +1.0 | 0.18 | OK | OK | 3 | +1.5 | 0.80 |
| Example 2 | 0 | 0 | +0.8 | +0.8 | 0.16 | OK | OK | 3 | +1.8 | 0.80 |
| Example 3 | 0 | +0.1 | +0.5 | +0.8 | 0.18 | OK | OK | 3 | +1.8 | 0.80 |
| Example 4 | 0 | 0 | 0 | 0 | 0.16 | OK | OK | 3 | +1.8 | 0.80 |
| Example 5 | 0 | +0.1 | 0 | +0.1 | 0.18 | OK | OK | 3 | +1.8 | 0.80 |
| Example 6 | +0.3 | +0.5 | +1.0 | +1.0 | 0.18 | OK | OK | 3 | +1.8 | 0.80 |
| Example 7 | +0.3 | +0.5 | +1.0 | +1.0 | 0.18 | OK | OK | 3 | +1.8 | 0.80 |
| Example 8 | +0.5 | +0.3 | +1.0 | +1.0 | 0.18 | OK | OK | 3 | +1.8 | 0.80 |
| Example 9 | +0.5 | +0.3 | +1.0 | +1.0 | 0.18 | OK | OK | 3 | +1.8 | 0.80 |

TABLE 1B-continued

| | Electric character (dB) | | | | Coefficient of dynamic friction | Running properties | | Dropout (number) | Rubbing noise increasing (dB) | Light transmittance (%) |
|---|---|---|---|---|---|---|---|---|---|---|
| | Output | | S/N ratio | | | | | | | |
| | RF | Chroma | Lumi | Chroma | | Runnability | Still (min) | | | |
| Example 10 | +0.5 | +0.5 | +0.8 | +1.0 | 0.18 | OK | OK | 3 | +1.8 | 0.80 |
| Example 11 | +0.5 | +0.5 | +0.8 | +1.0 | 0.18 | OK | OK | 3 | +1.8 | 0.80 |
| Example 12 | +0.5 | +0.5 | +1.0 | +0.6 | 0.18 | OK | OK | 3 | +1.8 | 0.80 |
| Example 13 | +0.5 | +0.5 | +1.0 | +0.6 | 0.18 | OK | OK | 3 | +1.8 | 0.80 |
| Example 14 | +0.3 | +0.5 | +0.8 | +1.0 | 0.18 | OK | OK | 3 | +1.8 | 0.80 |
| Example 15 | +0.3 | +0.5 | +0.8 | +1.0 | 0.18 | OK | OK | 3 | +1.8 | 0.80 |
| Example 16 | +0.5 | +0.3 | +1.0 | +0.6 | 0.18 | OK | OK | 3 | +1.8 | 0.80 |
| Example 17 | +0.5 | +0.3 | +1.0 | +0.6 | 0.18 | OK | OK | 3 | +1.8 | 0.80 |
| Example 18 | +0.5 | +0.5 | +1.0 | +1.1 | 0.18 | OK | OK | 3 | +1.8 | 0.80 |
| Example 19 | +0.6 | +0.5 | +1.0 | +1.1 | 0.18 | OK | OK | 3 | +1.8 | 0.80 |
| Example 20 | +0.1 | 0 | 0 | 0 | 0.22 | OK | OK | 3 | +1.8 | 0.80 |
| Example 21 | 0 | 0 | +0.1 | 0 | 0.22 | OK | OK | 3 | +1.5 | 0.80 |
| Example 22 | 0 | 0 | 0 | −0.1 | 0.22 | OK | OK | 3 | +1.9 | 0.80 |
| Example 23 | 0 | 0 | 0 | 0 | 0.22 | OK | OK | 3 | +1.8 | 0.80 |
| Example 24 | 0 | +0.1 | +0.1 | 0 | 0.22 | OK | OK | 3 | +1.6 | 0.80 |
| Example 25 | +0.5 | −0.8 | +0.3 | −0.5 | 0.18 | OK | OK | 4 | +1.8 | 0.70 |
| Example 26 | −0.2 | −0.5 | −0.4 | −0.6 | 0.18 | OK | OK | 4 | +1.8 | 0.70 |
| Example 27 | −0.5 | −0.6 | −0.2 | −0.7 | 0.18 | OK | OK | 4 | +1.8 | 0.70 |
| Example 28 | −0.7 | +0.4 | −0.8 | +0.6 | 0.18 | OK | OK | 4 | +1.8 | 0.70 |
| Example 29 | 0 | 0 | −0.1 | 0 | 0.18 | OK | OK | 4 | +2.5 | 0.70 |
| Example 30 | 0 | −0.2 | 0 | 0 | 0.18 | OK | OK | 4 | +2.6 | 0.70 |
| Example 31 | 0 | 0 | +0.1 | +0.1 | 0.16 | OK | OK | 8 | +2.6 | 0.70 |
| Example 32 | −0.1 | 0 | 0 | +0.4 | 0.16 | OK | OK | 3 | +1.8 | 0.80 |
| Example 33 | +0.2 | +0.1 | 0 | +0.8 | 0.18 | OK | OK | 2 | +1.2 | 0.80 |
| Comp. Example 1 | −2.0 | 0 | −1.8 | −0.1 | 0.16 | OK | 108 | 25 | +1.8 | 0.80 |
| Comp. Example 2 | −1.3 | 0 | −2.4 | +0.4 | 0.43 | stopped after 58 pass | 12 | 68 | +1.9 | 0.80 |
| Comp. Example 3 | −1.1 | −0.8 | +0.3 | −1.5 | 0.24 | stopped after 140 pass | OK | 21 | +3.2 | 0.80 |
| Comp. Example 4 | −1.4 | −0.7 | −1.4 | −1.5 | 0.22 | OK | OK | 6 | +6.5 | 0.80 |
| Comp. Example 5 | −1.5 | −1.2 | −1.9 | −1.6 | 0.22 | OK | OK | 3 | +8.0 | 0.80 |
| Comp. Example 6 | 0 | +0.1 | +0.2 | +0.1 | 0.22 | OK | OK | 4 | +1.6 | 2.40 |
| Comp. Example 7 | +0.2 | −3.0 | 0 | −4.7 | 0.20 | OK | OK | 6 | +2.1 | 0.80 |
| Comp. Example 8 | −3.8 | +0.3 | −5.2 | +0.1 | 0.20 | OK | OK | 5 | +2.4 | 0.80 |

As apparent from Table 1B, the examples 1 to 33 according to the invention yielded good results.

Figure 5A:
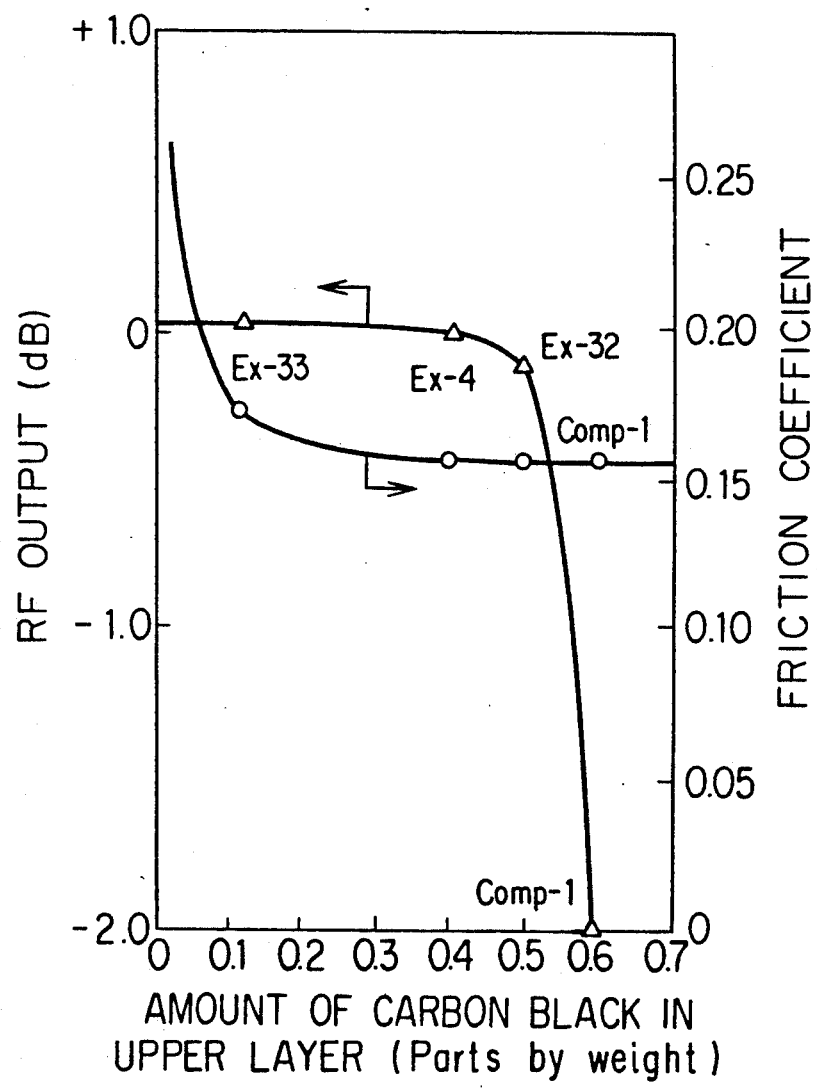
Figure 5B:
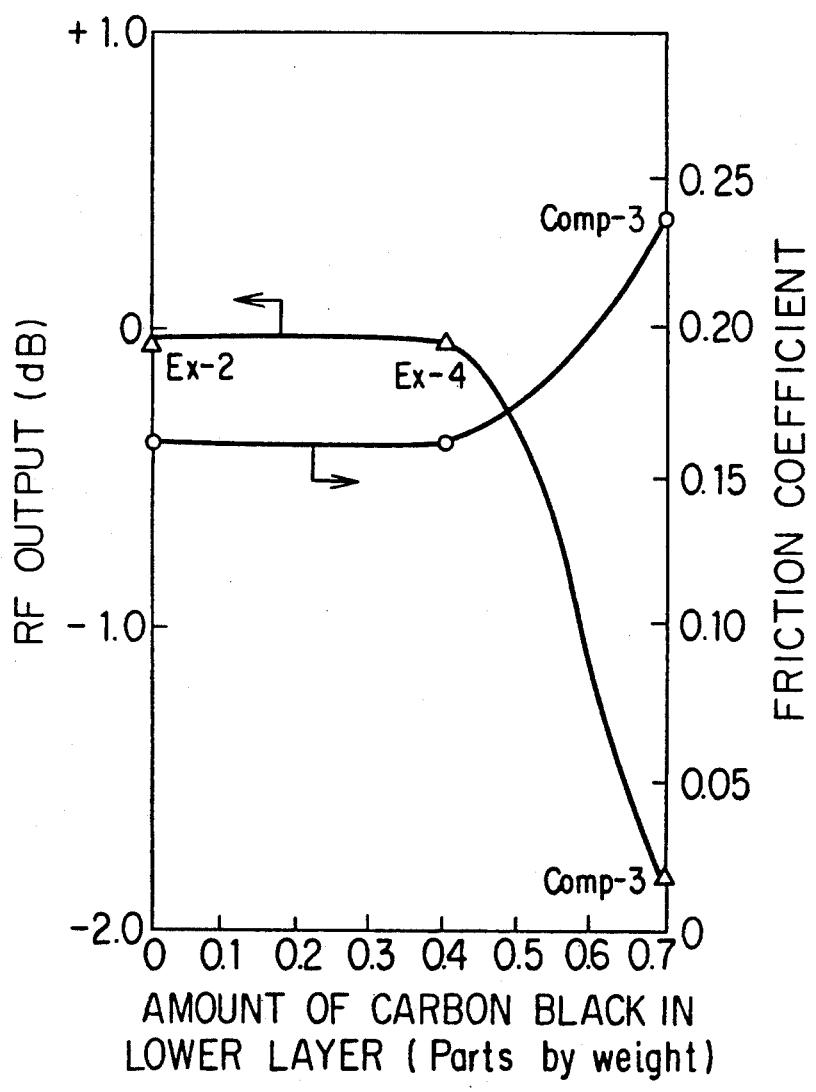

Next, the amount of carbon black in the upper and lower layers in Example 1 was varied, and RF output and coefficients of dynamic friction obtained are shown in FIGS. 5A and 5B. Carbon black contents of the lower layers of the samples shown in FIG. 5A are 0.4 parts by weight and that of the upper layers of the samples shown FIG. 5B are 0.5 parts by weight of the magnetic powder. It is apparent from these figures that the carbon black content in the upper layer should be 0.1 to 0.5 wt % based on the present invention, and that of the lower layer should be 0.4 wt % or less.

On the other hand, when the magnetic layer is formed in a triple layer structure as shown in Table 2, thicknesses of the upper layer, intermediate layer and lower layer were 0.3 μm, 0.7 μm and 2.4 μm, respectively excellent properties can be obtained by determining the amount of carbon black in the upper and intermediate layers according to the present invention.

TABLE 2

| | | Example 34 | Example 35 | Example 36 | Example 37 |
|---|---|---|---|---|---|
| Upper layer | Magnetic powder | | | | |
| | Hc (Oe) | 250 | 250 | 250 | 250 |
| | Particle size (μm) | 0.20 | 0.20 | 0.20 | 0.20 |
| | BET (m²/g) | 55 | 55 | 55 | 55 |
| | Carbon black | | | | |
| | Content (parts) | 0.5 | 0.5 | 0.3 | 0.3 |
| | Particle size (μm) | 40 | 40 | 40 | 40 |
| Middle layer | Magnetic powder | | | | |
| | Hc (Oe) | 750 | 750 | 750 | 750 |
| | Particle size (μm) | 0.28 | 0.28 | 0.28 | 0.28 |
| | BET (m²/g) | 45 | 45 | 45 | 45 |
| | Carbon black | | | | |
| | Content (parts) | 0 | 0.4 | 0 | 0.2 |
| | Particle size (μm) | — | 40 | — | 40 |
| Lower layer | Magnetic powder | | | | |
| | Hc (Oe) | 650 | 560 | 560 | 560 |
| | Particle size (μm) | 0.36 | 0.36 | 0.36 | 0.36 |
| | BET (m²/g) | 30 | 30 | 30 | 30 |
| | Carbon black | | | | |
| | Content (parts) | 0 | 0 | 0.4 | 0.1 |
| | Particle size (μm) | — | — | 40 | 40 |
| | Output (dB) RF/Chroma | +1.0/+1.2 | +1.0/+1.0 | +0.2/+1.0 | +1.2/+1.2 |

TABLE 2-continued

| | Example 34 | Example 35 | Example 36 | Example 37 |
|---|---|---|---|---|
| S/N ratio (dB) Lumi/Chroma | +0.8/+0.5 | +0.7/+0/6 | +1.0/+1.0 | +1.0/+1.0 |
| Coefficient of dynamic friction | 0.18 | 0.18 | 0.18 | 0.18 |
| Running properties | | | | |
| Runnability | OK | OK | OK | OK |
| Still (min) | OK | OK | OK | OK |
| Dropout (number) | 2 | 2 | 3 | 2 |
| Light transmittance (%) | 0.80 | 0.80 | 0.80 | 0.80 |

What is claimed is:

1. A magnetic recording medium comprising
a support,
a plurality of magnetic layers being provided on a surface of said support,
a backcoat layer being provided on the other surface of said support and comprising a binder and a carbon black, wherein
an outermost magnetic layer being provided at the outermost portion from said support among said plurality of magnetic layers comprises a binder, a magnetic powder and a carbon black in which the weight ratio of said carbon black to said magnetic powder is 0.1 to 0.5:100,
a magnetic layer other than said outermost magnetic layer comprises a binder, a magnetic powder different from said magnetic powder contained in said outermost magnetic layer and a carbon black in which the weight ratio of said carbon black to said magnetic powder is zero to 0.4:100.

2. A medium of claim 1, wherein said outermost magnetic layer has a thickness of not more than 0.6 μm.

3. A medium of claim 1, wherein said magnetic layer other than the outermost magnetic layer has a thickness of 1.5 to 3.0 μm.

4. A medium of claim 1, wherein the weight ratio of carbon black to the magnetic powder in said outermost magnetic layer $A_1$ and that in said magnetic layer other than the outermost magnetic layer $A_2$ has relation of $A_1 > A_2$.

5. A medium of claim 1, wherein the weight ratio of carbon black to the magnetic powder in said outermost magnetic layer is within the range of 0.11 to 0.45:100.

6. A medium of claim 1, wherein the weight ratio of carbon black to the magnetic powder in said magnetic layer other than the outermost magnetic layer is within the rang of 0 to 0.35:100.

7. A medium of claim 1, wherein the weight ratio of carbon black to the binder in said backcoat layer is within the range of 20:80 to 80:20.

8. A medium of claim 7, wherein the weight ratio of carbon black to the binder in said backcoat layer is within the range of 40:60 to 60:40.

9. A medium of claim 1, wherein said magnetic powder contained in said outermost magnetic layer or said magnetic layer other than the outermost layer is selected from the group consisting of powder of γ—Fe$_2$O$_3$, Co-containing γ—Fe$_2$O$_3$, Fe$_3$O$_4$, Co-containing Fe$_3$O$_4$, Fe, Ni, Co, Fe—Ni—Co alloy, Fe—Ni alloy, Fe—Al alloy, Fe—Al—Ni alloy, Fe—Al—Co alloy, Fe—Mn—An alloy, Fe—Ni—Zn alloy, Fe—Al—Ni—Co alloy, Fe—Al—Ni—Cr alloy, Fe—Al—Co—Cr alloy, Fe—Co—Ni—Cr alloy, Fe—Co—Ni—P alloy, and Co—Ni alloy.

10. A process for manufacturing a magnetic recording medium which comprises a support, a plurality of magnetic layers provided on a surface of said support and a backcoat layer provided on the other surface of said support, comprising steps of
preparing a first magnetic paint to be coated at the outermost portion of said plurality of magnetic layers, comprising a binder, magnetic powder and a carbon black in which the weight ratio of said carbon black to said magnetic powder is of 0.1 to 0.5:100,
preparing a second magnetic paint to be coated between said outermost magnetic layer and said support, comprising a binder, a magnetic powder different from said magnetic powder contained in said first magnetic paint and a carbon black in which the weight ratio of said carbon black to said magnetic powder is zero to 0.4:100,
coating said first magnetic paint and said second magnetic paint in multilayered state on a surface of said non-magnetic support under a wet on wet condition.
preparing a backcoat solution comprising a binder and a carbon black, and
coating said backcoat solution on the other surface of said support.

11. A process of claim 10, wherein said outermost magnetic layer is coated so as to make a layer thickness of not more than 0.6 μm.

12. A process of claim 10, wherein said magnetic layer other than the outermost magnetic layer is coated so as to make a layer thickness of from 1.5 to 3.0 μm.

13. A process of claim 10, wherein the weight ratio of carbon black to the magnetic powder in said first magnetic paint $A_1$ and that in said second magnetic paint $A_2$ has relation of $A_1 > A_2$.

14. A process of claim 10, wherein the weight ratio of carbon black to the magnetic powder in said first outermost magnetic paint is within the range of 0.11 to 0.45:100.

15. A process of claim 10, wherein the weight ratio of carbon black to the magnetic powder in said second magnetic paint is within the range of 0 to 0.35:100.

16. A process of claim 10, wherein the weight ratio of carbon black to the binder in said backcoat solution is within the range of 20:80 to 80:20.

17. A process of claim 16, wherein the weight ratio of carbon black to the binder in said backcoat solution is within the range of 40:60 to 60:40.

18. A process of claim 1, wherein said magnetic powder contained in said first or said second magnetic paint is selected from the group consisting of powder of γ—Fe$_2$O$_3$, Co-containing γ—Fe$_2$O$_3$, Fe$_3$O$_4$, Co-containing Fe$_3$O$_4$, Fe, Ni, Co, Fe—Ni—Co alloy, Fe—Ni alloy, Fe—Al alloy, Fe—Al—Ni alloy, Fe—Al—Co alloy, Fe—Mn—Zn alloy, Fe—Ni—Zn alloy, Fe—Al—Ni—Co alloy, Fe—Al—Ni—Cr alloy, Fe—Al—Co—Cr alloy, Fe—Co—Ni—Cr alloy, Fe—Co—Ni—P alloy, and Co—Ni alloy.

* * * * *